Nov. 7, 1950   R. A. WEBER   2,528,565
SAFEGUARDING DEVICE FOR MACHINE TOOLS
Filed June 26, 1944   2 Sheets-Sheet 2
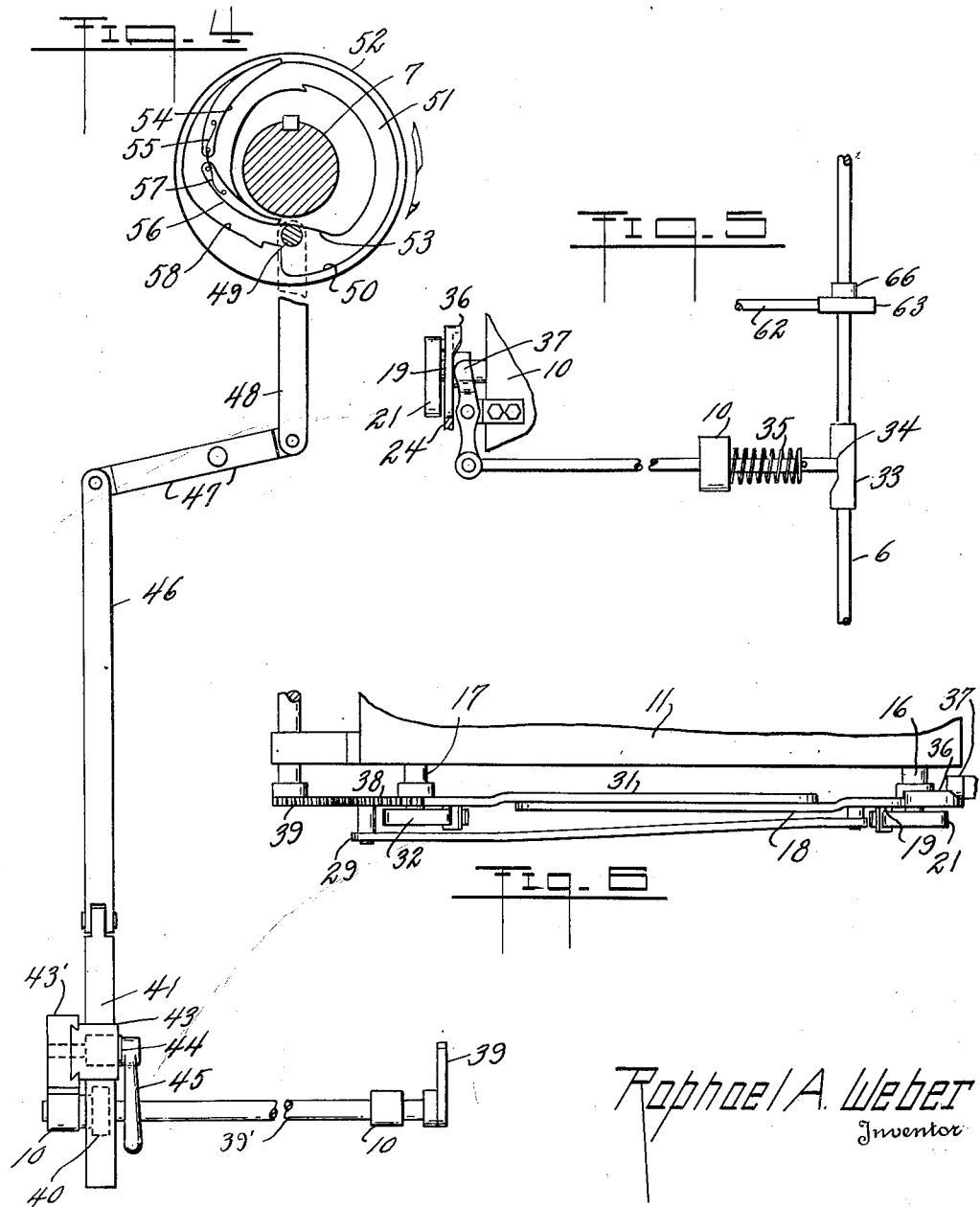

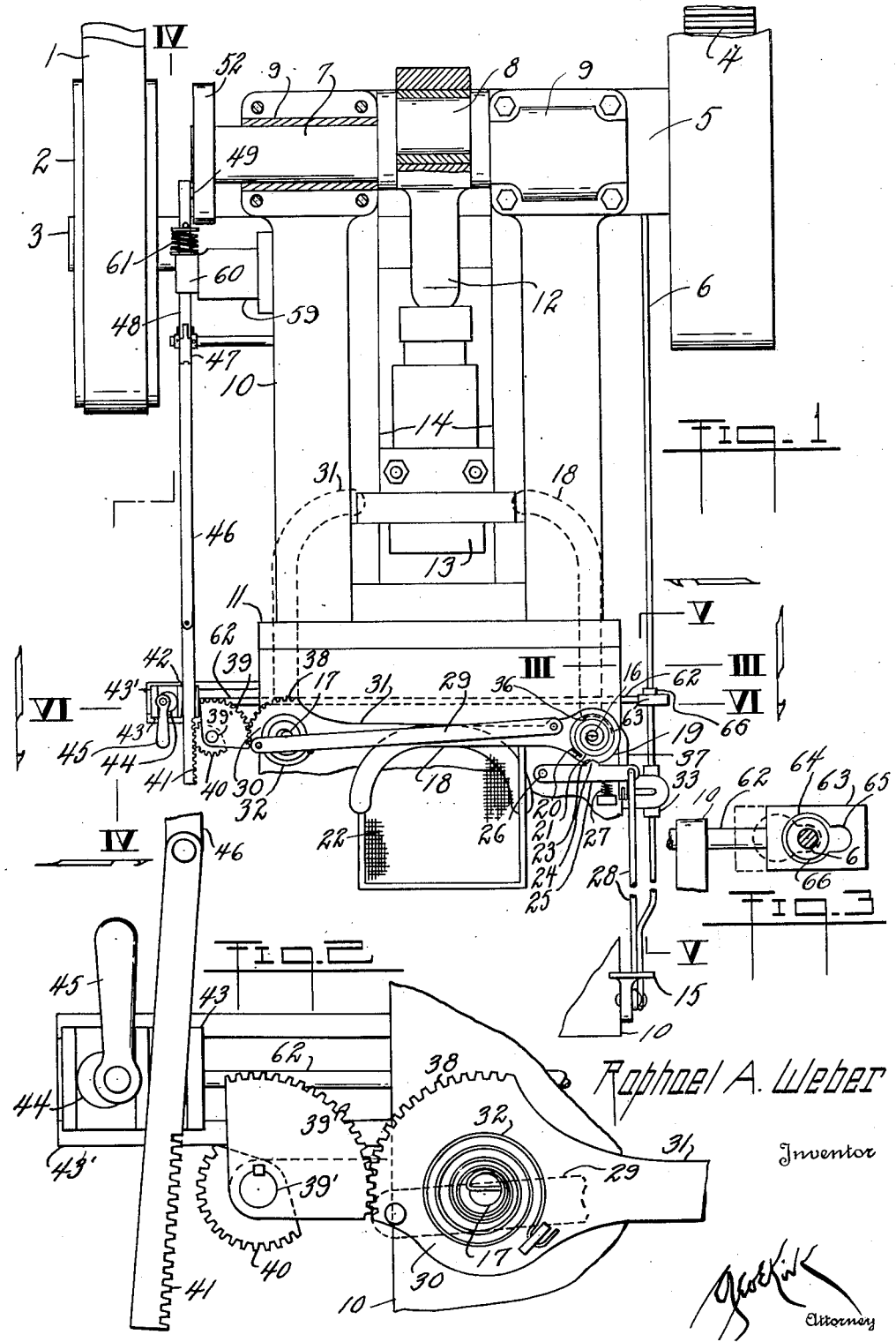

Patented Nov. 7, 1950

2,528,565

UNITED STATES PATENT OFFICE 2,528,565

SAFEGUARDING DEVICE FOR MACHINE TOOLS

Raphael A. Weber, Toledo, Ohio

Application June 26, 1944, Serial No. 542,153

6 Claims. (Cl. 192—133)

This invention relates to interacting control connections.

This invention has utility when incorporated in fending devices for machine tools whether the operation be from forward or reverse, and even including supplemental lock-out against functioning, say of a reciprocating member of the punch press type.

Referring to the drawings:

Fig. 1 is a front view of an embodiment of the invention as incorporated in connection with a machine tool of the press type, parts being broken away;

Fig. 2 is a detail view on an enlarged scale of features of the fender device and the machine drive connection thereto shown in disconnected position;

Fig. 3 is a section on the line III—III, Fig. 1, showing the lock-out shifted to drive-precluding position;

Fig. 4 is a view on the line IV—IV, Fig. 1, showing the drive connections for the device as from the machine tool;

Fig. 5 is a view on the line V—V, Fig. 1, showing features of the intercontrol from the fending device as releasing the control for permitting the machine to drive; and Fig. 6 is a view on the line VI—VI, Fig. 1, showing the fending device mounting on the bed or frame of the machine tool.

Power drive from belt 1 may rotate pulley 2 of shaft 3 as a continuous operation, there being gearing 4 having control connection in housing 5 operable by rod 6 to cut in for cycle of operation of shaft 7 having crank 8. This shaft 7 is mounted in bearings 9 of frame 10 having deck or table 11. The crank 8 has link connection 12 to member 13 reciprocable in guide 14 of this frame in the travel toward and from the table 11. There is thus provided an entrance region thru which work may be introduced therebetween. Treadle 15 as depressed may cause the machine to function, say for a cycle of operations. The attendant may place and remove the work in position on the table or working part 11 as a relatively movable opposing working part or member 13 is clear thereof.

It is important there be avoidance of hazard to the attendant as against getting into the path of this plunger 13 during its transit. Features of the safeguard under the invention herein include a pair of bearings 16, 17. Mounted in the bearing is an arm 18 having disk portion 19. Stop 20 on this disk has fixed therewith torsion spring 21 with the inner terminus thereof engaging this fixed bearing having stub shaft 16. The wraps of this torsion spiral spring are such that the arm 18 is urged to swing toward upright position and thereby carry a curtain mesh work protection or screen 22 in protective position either vertically or overhanging the table 11, and thus in a position tending to intercept movement by the operator toward the work entrance region to the member 13. If the operator be in this region, the ascent or swing of the arm or fending device 18 tends to thrust such portion of the operator as may be so disposed clear of any position which might be hurtful in the transit of this member 13. This arm 18 is normally held clear of this table 11 due to the fact that the disk 19 has notch 23 normally engaged by projection 24 from lever 25 having fixed pivoted connection 26 with the frame portion or table 11. The co-operating parts 23, 24, form a catch. Upon release of this catch 23, 24, the torsion spring or fender actuator 21 throws the fender arm independently of the drive operating the machine tool. Compression spring 27 normally holds this lever 25 in this holding position as to the arm 18. Link 28 from this lever 25 to the treadle 15 serves at initial depression of this treadle 15 to clear this projection 24 from the seat or notch 23, thereby permitting the torsion spiral spring 21 to swing the arm 18 into upward protective relation. From adjacent this disk 19 link 29 extends to disk 30 on the bearing 17. This disk 30 has arm 31 oppositely to the arm 18. Torsion spiral spring 32 is connected and operates as does the spiral spring 21, tending normally to swing this arm 31 upward as the disk 19 is released and such movement is permitted due to the link 29. Accordingly, this fending device is of spread for two direction bounds. The length of the link 29 and the length of the arms as well as their general plane of direction may be adapted especially to a peculiar type of machine. The instance herein is a showing for efficient adaptation within the practical ranges for position of the operator and that position which would preclude hazard occurring to such operator.

This treadle release is for the protective devices or arms 81, 31, to swing upward forthwith into the safeguarding position. This initial depression of the treadle 15 in acting upon the rod 6 shifts catch portion 33 to engaging position with stop 34 (Fig. 5) as normally thrust thereagainst by compression helical spring 35. Adjacent the disk 19 and fixed therewith is cam 36 effective as this arm 18 starts to swing toward fending position to cause lever 37 to have a pull action on the stop 34 against the resistance of the spring 35. Accordingly, there is at once a release to permit the treadle 15 to effect full stroke on the rod 6 for the machine tool to function in its cycle of operation.

The arm 31 includes toothed segment 38 in mesh with toothed segment 39 (Figs. 1, 2). Fixed with this segment 39 on shaft 39' in the frame 10 is toothed member 40. Adjacent this toothed member 40 is rack 41 in guide 42 in slide 43. This guide 42 has its position in way 43' controlled by eccentric 44 operable by handle 45 to rotate in the slide 43. This swinging of the handle 45 may pull the rack 41 clear of mesh relation with the toothed member 40. As in mesh relation, this rack 41 is reciprocable in the guide 42 as actuated by the toothed member 40 when the arms 18, 31, swing upward or into protective position. This movement of the rack 41 is effective through link 46 (Fig. 4), lever 47, and rod 48, to pull downward pin 49 against cam portion 50 having way 51 therebetween in cam 53 on the shaft 7. Accordingly, simultaneous with the swinging of the arms 18, 31, of this device into safeguarding position, this pin 49 is moved away from cam portion 53. The operation of the treadle 15, causing the shaft 7 to function for a cycle of operation, directs the pin 49 in the cam way 51 to pass radially inward of shoe 54 as yieldably held retracted by spring 55. From thence in this transit of the pin 49 it rides against the radially inward side of arm 56 and urges such arm against the action of spring 57 for this pin 49 to come to rest at position adjacent the cam 53. This path 51 past the arms 54, 56, has brought about a reversal of the initial travel herein, so that as the rod 48 is lifted by the pin 49 and the lever 47 depresses the rod 46 the rack 41 in its rise is effective through the segments 39, 38, to rock the arm 31 in down or clearance position and through the link 29 likewise to swing the arm 18 with the springs 21, 32, again placed under torsion and so held by the stop 23, 24. This accordingly places these parts in normal stop position for repetition of the cycle of operation.

Should the operator be in position to preclude the swinging of the arms into their protective position, there is no operation of the release for the treadle to operate the rod 6, and there is no functioning of the shaft 7. Again, should there be reverse action of the drive, the pin 49 may not ride inward of the arm 56 but outward therefrom along cam portion 58 and, as clear therefrom, will cause the arm 54 to let it pass into the cam way 51. However, in this movement as directed by the cam portion 58, the pin 49 is operated from the shaft 7 to bring the arms 18, 31 into fending position. In the event there should be effected any functioning of the machine, say as not safeguarded by the delayed operation at the treadle, the cam portion 53 insures positive throwing of the arms 18, 31, into fending position as does the positive action of the cam portion 58. Bracket 59 on the frame 10 (Fig. 1) has guide 60 for this rod portion 48 and compression helical spring 61 normally holds this pin 49 upward into the position clear of the cam portion 50.

In the event there be occasion to repair the machine tool bed or table, or as to the member 31, it is in order so to do for the attendant or one so serving to operate the handle 45, disconnecting the rack 41 from the toothed member 40. This movement of the handle 45 immediately thrusts rod 62 having terminal block 63 with opening 64 embracing the rod 6 (Fig. 3). In this shifting, the block 63 is so moved as to the rod 6 that the rod 6 passes away from the opening 64 into slot extension 65 therefrom so that collar 66 on the rod 6 may not move downward upon any depression attempt at the treadle 15. Accordingly, this is a means normally holding the rod 6 so that cutting in of the drive for the shaft 7 may not be had. This safeguarding is continuously effective so long as the rack 41 is cut out from its mesh relation with the toothed member 40 due to the position of the handle 45. Thus, as this repair or substitutive operation is completed, the swinging of the handle 45 back to bring the rack 41 into mesh with the toothed member 40 at once releases the block 63 from holding relation as to the collar 66 and the operator may proceed with the normal operation of the treadle for the cycle of operation of this machine tool whether the operation be for shaping, punching, dressing, or other forming or treating operations.

Hereunder, there is provided a safeguarding device or attachment generally adaptable in a range of dimension and location for various types of machine tools having a region of hazard for the operator. This device may be effective against machine operation as there is interference with the function for fending. It is a device which is timed for the fending position to occur before the machine comes to a position of hazard. The release may be manually effected by the operator say from the treadle. The operation may be from the machine drive, even whether forward or reverse in insuring that, regardless of the direction of descent or transit for the member 13 toward position of hazard, there is a functioning or placing of the fending device in fending position. In the event there be purpose to have clearway against the device functioning as a safeguard, the connection herein for such is one to preclude operation of the machine tool.

The frame 10 is of a power-driven machine tool having opposed working parts 11, 13. The part 11 is the bed and the part 13 is the plunger reciprocable toward and from the bed. The spacing or clearance between the parts 11, 13, at the maximum lift for the plunger 13 leaves an entrance region. The drive for the tool is thru the belt 1 to actuate the plunger in the guide 14 therefor from the shaft 7 connected thru the crank 8 and the link 12 to the plunger 13. With the entrance region open, the operator may place the work on the table or deck 11 and then depress the treadle 15. Initiation of this depression of the treadle 15 is not effective on the press-cut-in control thru the rod 6 until such rod is released. The release is thru the link 28 pulling the lever 25 at the catch 23, 24 for the springs or actuating means 21, 32, responding to the actuator treadle for the fending device arm 18, 31, to swing upward and thru the cam 36 clear the stop 34 from the catch 33. The cut-in control rod 6 now connects the machine tool drive to operate a cycle, herein a complete down and back movement for the plunger 13.

The swing bearings 16, 17, provide mounting for the fending device. The toothed means 38, 39, 40, 41 (Fig. 2) from the fending device, thru the connections 46, 47, 48 (Fig. 4) provide the stop device for the shaft 7 from the fending device, which is separate from and operable independently of the rod 6. This is one interference against operation of the shaft 7, while a second interference is thru the handle 45 and rod 62 (Fig. 2, 3) to lock the cut-in control rod 6 against downpull from the treadle or actuator 15, supplemental to the catch 33, 34. The fending device arms 18, 31, are shown as carrying a curtain 22.

What is claimed and it is desired to secure by United States Letters Patent is:

1. The combination with a machine tool having relatively movable opposing parts to approach and recede in a cycle at an entrance region, a shaft for operating the machine tool, a drive for the shaft, a cut-in control for connecting the drive to operate the shaft for a cycle, and a frame in which the parts are mounted; of a fending device mounted on the frame and laterally spaced from the entrance region and having an out-of-use position therefor clear of the entrance region, fending device actuation means extending from the device to the drive operated shaft independent of the control and coacting to provide positive positioning of the device at in-use position during shaft rotation, and a manually operable disconnecting means for the actuating means to the device, said disconnecting means having fixed therewith a holding means precluding drive connection effecting operation of the cut-in control.

2. The structure of claim 1 wherein said fending device comprises a pair of arms, and a pair of parallel oppositely rotatable rock shafts, one at each side of said entrance region, one shaft providing pivot mounting for one of the arms and the other shaft providing pivot mounting for the other arm.

3. The structure of claim 1 wherein said fending device actuating means comprises a cam on said tool operating shaft, a rack, rack reciprocating means coacting with the cam, and toothed means providing connection from the rack to position the device.

4. The structure of claim 3 wherein said manually operable disconnecting means embodies a shifter adapted to position the rack clear of said toothed means.

5. The structure of claim 1 wherein said fending device actuating means comprises a two-way effective cam on said tool operating shaft and reciprocable connecting means between the cam and device responsive to either direction of shaft operation to position the device.

6. The structure of claim 1 wherein said holding means includes a slidable stop.

RAPHAEL A. WEBER.

REFERENCES CITED

The following references are of record in the file of this patent:

UNITED STATES PATENTS

| Number | Name | Date |
|---|---|---|
| 618,064 | Dicks | Jan. 24, 1899 |
| 1,137,550 | Sweeney | Apr. 27, 1915 |
| 1,257,759 | Stier | Feb. 26, 1918 |
| 1,258,525 | Beyer | Mar. 5, 1918 |
| 1,305,763 | Zeh | June 3, 1919 |
| 1,314,750 | MacDonald et al. | Sept. 2, 1919 |
| 1,648,232 | Ischinger | Nov. 8, 1927 |
| 2,381,237 | Wells | Aug. 7, 1945 |

FOREIGN PATENTS

| Number | Country | Date |
|---|---|---|
| 695,949 | Germany | Sept. 6, 1940 |